United States Patent
Lee et al.

(10) Patent No.: US 10,965,421 B2
(45) Date of Patent: Mar. 30, 2021

(54) METHOD FOR TRANSMITTING AND RECEIVING UPLINK PHASE TRACKING REFERENCE SIGNAL AND DEVICES SUPPORTING THE SAME

(71) Applicant: LG ELECTRONICS INC., Seoul (KR)

(72) Inventors: Kilbom Lee, Seoul (KR); Jiwon Kang, Seoul (KR); Haewook Park, Seoul (KR); Jonghyun Park, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/194,209

(22) Filed: Nov. 16, 2018

(65) Prior Publication Data

US 2019/0149299 A1  May 16, 2019

Related U.S. Application Data

(60) Provisional application No. 62/587,439, filed on Nov. 16, 2017.

(51) Int. Cl.
*H04L 5/00* (2006.01)
*H04B 7/0456* (2017.01)
*H04B 7/0404* (2017.01)

(52) U.S. Cl.
CPC ......... *H04L 5/0051* (2013.01); *H04B 7/0456* (2013.01); *H04L 5/0092* (2013.01); *H04B 7/0404* (2013.01)

(58) Field of Classification Search
CPC . H04L 5/0051; H04L 5/0092; H04L 27/3872; H04B 7/0456; H04B 7/0404
See application file for complete search history.

(56) References Cited

U.S. PATENT DOCUMENTS

| | | | | |
|---|---|---|---|---|
| 2013/0294382 | A1* | 11/2013 | Xu | H04L 5/0048 370/329 |
| 2018/0183503 | A1* | 6/2018 | Rahman | H04W 72/042 |
| 2019/0068268 | A1* | 2/2019 | Zhang | H04B 7/0408 |
| 2019/0296955 | A1* | 9/2019 | Akkarakaran | H04L 27/2636 |
| 2020/0177416 | A1* | 6/2020 | Jiang | H04L 27/2613 |

FOREIGN PATENT DOCUMENTS

WO    WO-2019051085 A1 *  3/2019  ............... H04L 5/00

\* cited by examiner

*Primary Examiner* — Edan Orgad
*Assistant Examiner* — Malick A Sohrab
(74) *Attorney, Agent, or Firm* — Lee Hong Degerman Kang Waimey

(57) ABSTRACT

According to the present invention, a method of transmitting and receiving an uplink phase tracking reference signal between a user equipment and a base station in a wireless communication and an apparatus supporting the same are disclosed.
According to an example applicable to the present invention, a user equipment can transmit an uplink PT-RS to a base station using the actual number of PT-RS ports which is determined based on the maximum uplink phase tracking reference signal (PT-RS) ports received from the base station and a precoding matrix set to the UE.

14 Claims, 14 Drawing Sheets

FIG. 8

| Configuration type 1<br>CDM-T & CDM-F | Configuration type 2<br>CDM-T & CDM-F |
|---|---|
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |

(a)

(b)

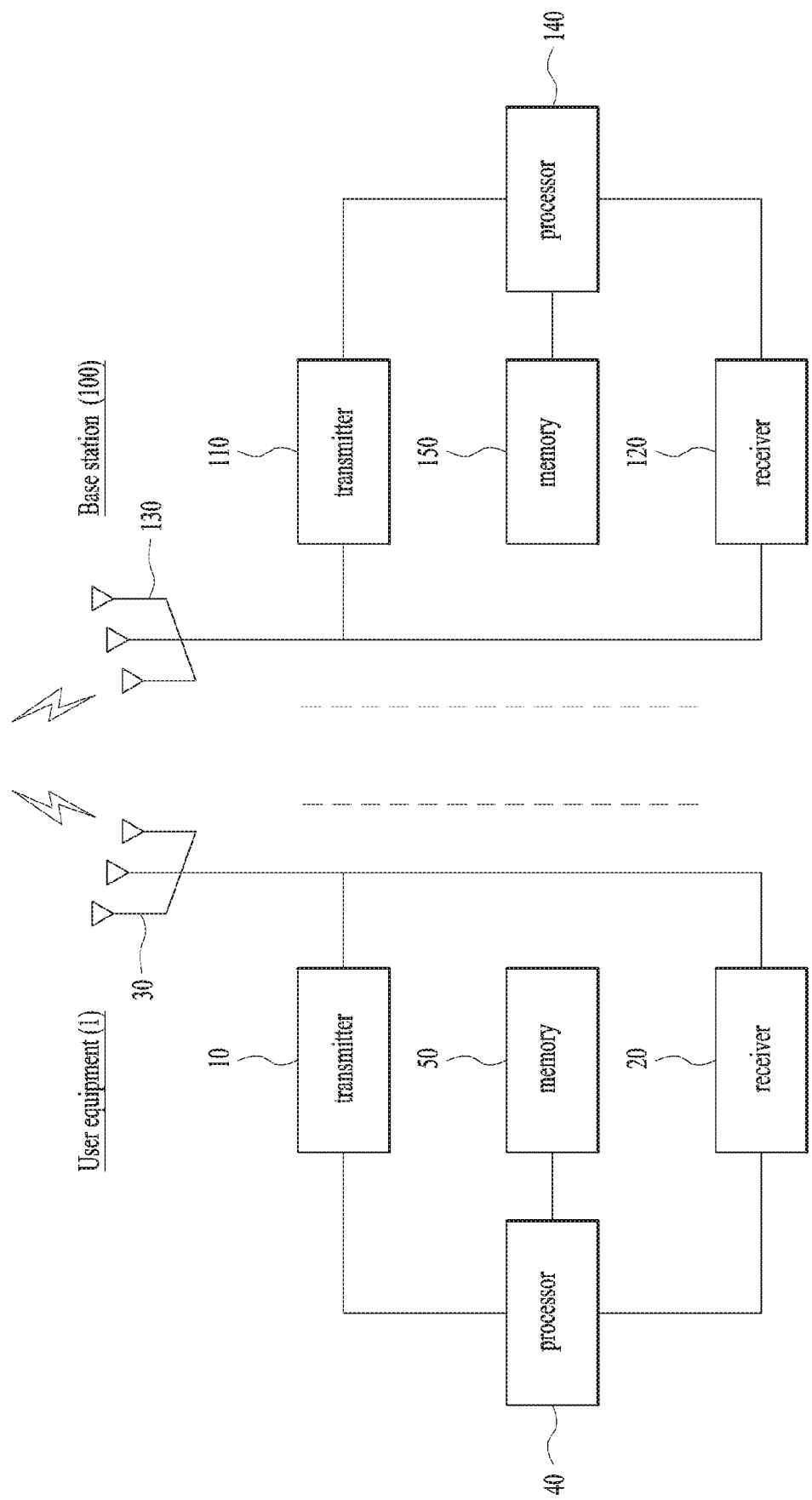

METHOD FOR TRANSMITTING AND RECEIVING UPLINK PHASE TRACKING REFERENCE SIGNAL AND DEVICES SUPPORTING THE SAME

Pursuant to 35 U.S.C. § 119(e), this application claims the benefit of U.S. Provisional Patent Application No. 62/587,439, filed on Nov. 16, 2017, the contents of which are hereby incorporated by reference herein in its entirety.

BACKGROUND OF THE INVENTION

Field of the Invention

Following description relates to a wireless communication system, and more particularly, to a method of transmitting and receiving an uplink phase tracking reference signal between a user equipment and a base station in a wireless communication system and an apparatus supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

In particular, since a method of transmitting and receiving a signal through various frequency bands is considered, a concept for a phase tracking reference signal (PT-RS) for estimating phase noise between a user equipment and a base station on the various frequency bands is in discussion in various ways.

SUMMARY OF THE INVENTION

A technical task of the present invention is to provide a method of transmitting and receiving an uplink phase tracking reference signal between a user equipment and a base station in a wireless communication system and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method of transmitting and receiving an uplink phase tracking reference signal between a user equipment and a base station in a wireless communication system and an apparatus supporting the same.

In an aspect of the present invention, provided herein is a method for transmitting a phase tracking reference signal (PT-RS) by a user equipment (UE) in a wireless communication system, the method comprises: receiving information on a maximum number of uplink PT-RS port from a base station; and transmitting the PT-RS based on an actual number of uplink PT-RS port to the base station. Herein, the actual number of uplink PT-RS port is determined based on the information on the maximum number of uplink PT-RS port and a precoding matrix configured to the UE.

The information on the maximum number of uplink PT-RS port may be received via higher layer signaling.

The actual number of uplink PT-RS port may be equal to or smaller than the maximum number of uplink PT-RS port.

The precoding matrix configured to the UE may be configured based on a transmitted precoding matrix indicator (TPMI).

The actual number of uplink PT-RS port determined based on a full-coherent precoding matrix configured to the UE may be determined as 1.

The actual number of uplink PT-RS port determined based on a partial-coherent precoding matrix or non-coherent precoding matrix configured to the UE may be determined up to the maximum number of uplink PT-RS port.

The actual number of uplink PT-RS port determined based on the partial-coherent precoding matrix or non-coherent precoding matrix configured to the UE may be determined under the assumption that one or more first antenna ports having non-zero value in a first column of the precoding matrix have an identical phase noise source and one or more second antenna ports having non-zero value in a different column from the first column of the precoding matrix have different phase noise from the one or more first antenna ports.

The UE may be configured with one or more sounding reference signal (SRS) resources.

The one or more SRS resources may be configured by one or more SRS resource indications (SRIs).

The one or more SRIs may be received via downlink control information (DCI).

The actual number of uplink PT-RS port may be determined additionally based on a number of SRS resources configured to the UE.

In another aspect of the present invention, provided herein is a communication device for transmitting an uplink phase tracking reference signal (PT-RS) in a wireless communication system. The communication device my comprise a memory; and a processor operably coupled with the memory and configured to: receive information on a maximum number of uplink PT-RS port from a base station; and transmit the PT-RS based on an actual number of uplink PT-RS port to the base station. Herein, the actual number of uplink PT-RS port is determined based on the information on the maximum number of uplink PT-RS port and a precoding matrix configured to the communication device.

The information on the maximum number of uplink PT-RS port may be received via higher layer signaling, and the precoding matrix configured to the communication device may be configured based on downlink control information (DCI) or higher layer signaling.

The actual number of uplink PT-RS port determined based on a full-coherent precoding matrix configured to the communication device may be determined as 1 regardless of the maximum number of uplink PT-RS port.

The actual number of uplink PT-RS port determined based on a partial-coherent precoding matrix or non-coherent precoding matrix configured to the communication may be determined up to the maximum number of uplink PT-RS port.

In a further aspect of the present invention, provided herein is a communication device for receiving an uplink phase tracking reference signal (PT-RS) in a wireless communication system. The communication device may comprise a memory; and a processor operably coupled with the memory and configured to: transmit information on a maximum number of uplink PT-RS port to a user equipment; and receive the PT-RS based on an actual number of uplink PT-RS port from the user equipment. Herein, The actual number of uplink PT-RS port is determined based on the information on the maximum number of uplink PT-RS port and a precoding matrix configured to the user equipment.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present invention, when a user equipment transmits an uplink PT-RS, the actual number of uplink PT-RS ports at which the uplink PT-RS is transmitted can be determined based on a precoding matrix set/allocated to the user equipment as well as the maximum number of uplink PT-RS ports set to the user equipment.

In other word, the actual number of uplink PT-RS ports according to the present invention can be dynamically determined/configured based on the precoding matrix set/allocated to the user equipment. In particular, the user equipment and the base station can dynamically determine the actual number of PT-RS ports based on the precoding matrix set/allocated to the user equipment without managing the maximum number of PT-RS ports all the time. By doing so, it is able to reduce RS overhead due to a PT-RS.

Meanwhile, according to the present invention, it is able to determine/configure the actual number of uplink PT-RS ports based on a beam (or SRS (Sounding Reference Signal) resource).

The above-described aspects of the present invention are merely a part of preferred embodiments of the present invention. Those skilled in the art will derive and understand various embodiments reflecting the technical features of the present invention from the following detailed description of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 8 is a diagram briefly illustrating two DM-RS configuration types applicable to the present invention;

FIG. 14 is a diagram illustrating configurations of a user equipment and a base station in which proposed embodiments are implementable.

DETAILED DESCRIPTION OF THE INVENTION

Figure 1:
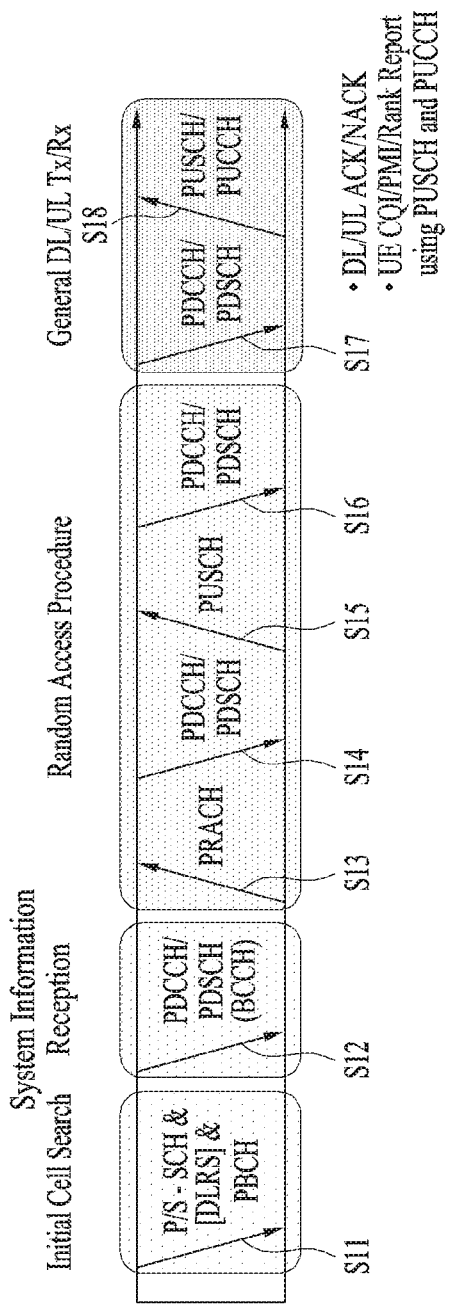
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

In order to make the technological characteristics of the present invention to be more clearly understood, embodiments of the present invention are explained centering on 3GPP NR system. However, the embodiments proposed by the present invention can be identically applied to a different wireless system (e.g., 3GPP LTE, IEEE 802.16, IEEE 802.11, etc.).

1. NR System 1.1. Physical Channels and Signal Transmission and Reception Method Using the Same In a wireless access system, a UE receives information from an gNB on a DL and transmits information to the gNB on a UL. The information transmitted and received between the UE and the gNB includes general data information and various types of control information. There are many physical channels according to the types/usages of information transmitted and received between the gNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an gNB. Specifically, the UE synchronizes its timing to the gNB and acquires information such as a cell Identifier (ID) by receiving a Primary Synchronization Channel (P-SCH) and a Secondary Synchronization Channel (S-SCH) from the gNB.

Then the UE may acquire information broadcast in the cell by receiving a Physical Broadcast Channel (PBCH) from the gNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the gNB, the UE may perform a random access procedure with the gNB (S13 to S16). In the random access procedure, the UE may transmit a preamble on a Physical Random Access Channel (PRACH) (S13) and may receive a Random Access Response (RAR) via a PDCCH and a PDSCH associated with the PDCCH (S14). The UE transmits Physical Uplink Shared Channel (PUSCH) using scheduling information included in the RAR, and perform a contention resolution procedure including reception of a PDCCH signal and a PDSCH signal corresponding to the PDCCH signal (S16).

After the above procedure, the UE may receive a PDCCH and/or a PDSCH from the gNB (S17) and transmit a PUSCH and/or a Physical Uplink Control Channel (PUCCH) to the gNB (S18), in a general UL/DL signal transmission procedure.

Control information that the UE transmits to the gNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Numerologies

The NR system to which the present invention is applicable supports various OFDM (Orthogonal Frequency Division Multiplexing) numerologies shown in the following table. In this case, the value of numerology parameter μ and cyclic prefix information per carrier bandwidth part can be signaled in DL and UL, respectively. For example, the value of numerology parameter μ and cyclic prefix information per downlink carrier bandwidth part may be signaled though DL-BWP-mu and DL-MWP-cp corresponding to higher layer signaling. As another example, the value of numerology parameter μ and cyclic prefix information per uplink carrier bandwidth part may be signaled though UL-BWP-mu and UL-MWP-cp corresponding to higher layer signaling.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

1.3 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

For numerology parameter μ or subcarrier spacing Δf based on the parameter, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 2 shows the number of OFDM symbols in each slot/frame/subframe in the case of the normal cyclic prefix, and Table 3 shows the number of OFDM symbols in each slot/frame/subframe in the case of the extended cyclic prefix.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 2:
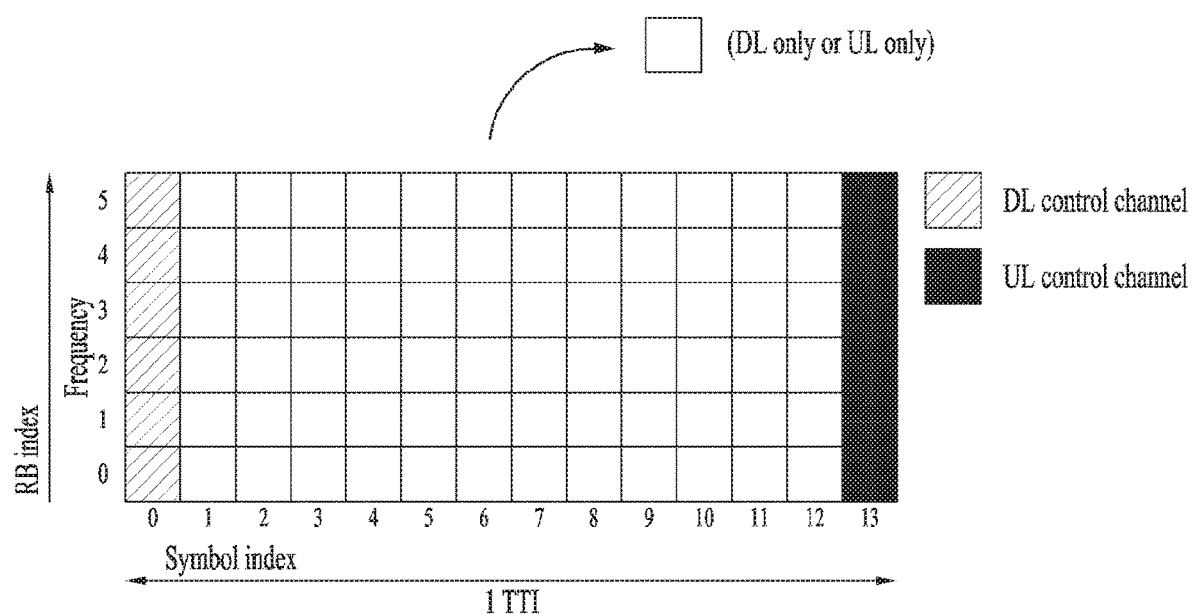
FIG. 2 is a diagram illustrating a self-contained skot structure applicable to the present invention.

FIG. 2 is a diagram illustrating a self-contained slot structure applicable to the present invention.

In FIG. 2, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 2.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

1.4. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 3:
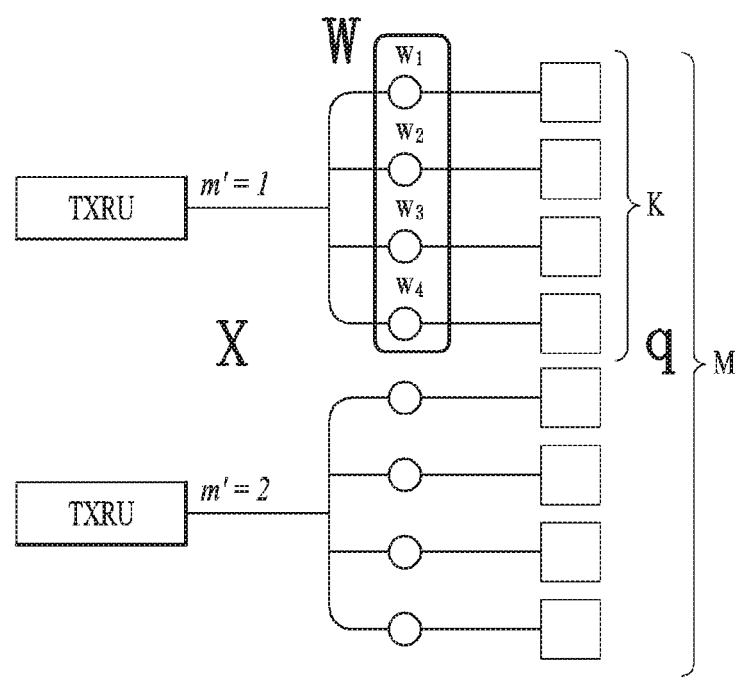
FIGS. 3 and 4 are diagrams illustrating representative connection methods for connecting TXRUs to antenna elements.
Figure 4:
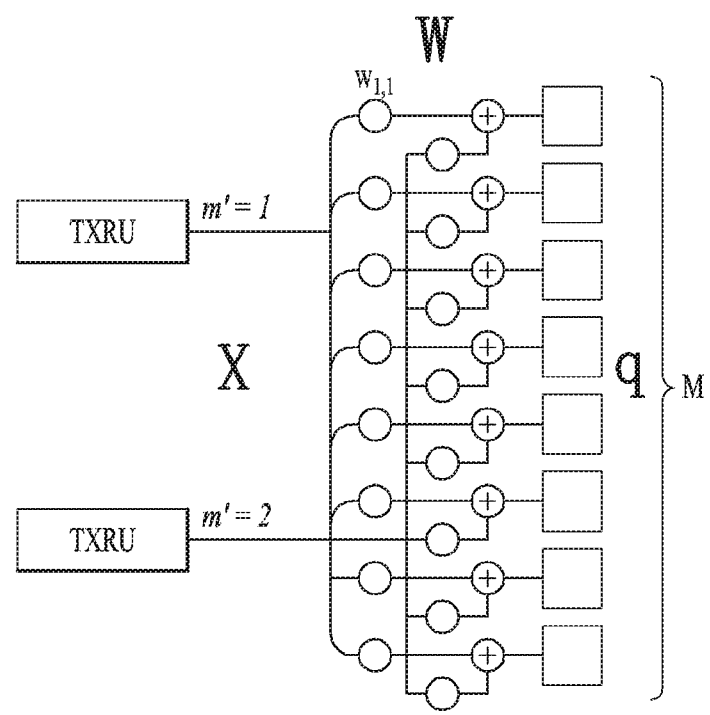

FIGS. 3 and 4 are diagrams illustrating representative methods for connecting TXRUs to antenna elements. Here, the TXRU virtualization model represents the relationship between TXRU output signals and antenna element output signals.

FIG. 3 shows a method for connecting TXRUs to sub-arrays. In FIG. 3, one antenna element is connected to one TXRU.

Meanwhile, FIG. 4B shows a method for connecting all TXRUs to all antenna elements. In FIG. 4, all antenna element are connected to all TXRUs. In this case, separate addition units are required to connect all antenna elements to all TXRUs as shown in FIG. 4.

In FIGS. 3 and 4, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 3 has a disadvantage in that it is difficult to achieve beamforming focusing but has an advantage in that all antennas can be configured at low cost.

On the contrary, the configuration shown in FIG. 4 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 5:
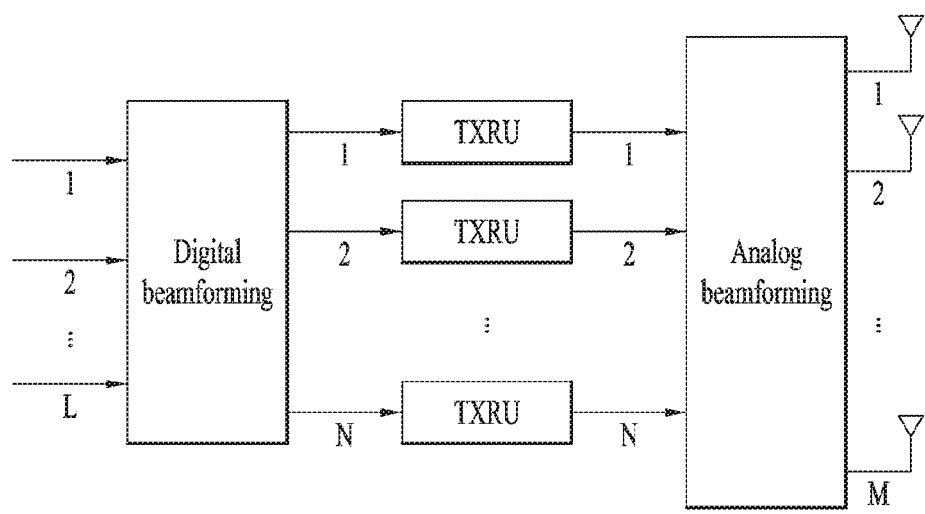
FIG. 5 is a schematic diagram illustrating a hybrid beamforming structure according to an embodiment of the present invention from the perspective of TXRUs and physical antennas.

FIG. 5 is a schematic diagram illustrating a hybrid beamforming structure according to an embodiment of the present invention from the perspective of TXRUs and physical antennas. In FIG. 5, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific slot (at least with respect to synchronization signals, system information, paging, etc.) and then perform signal transmission in order to allow all UEs to have reception opportunities has been considered in the NR system to which the present invention is applicable.

Figure 6:
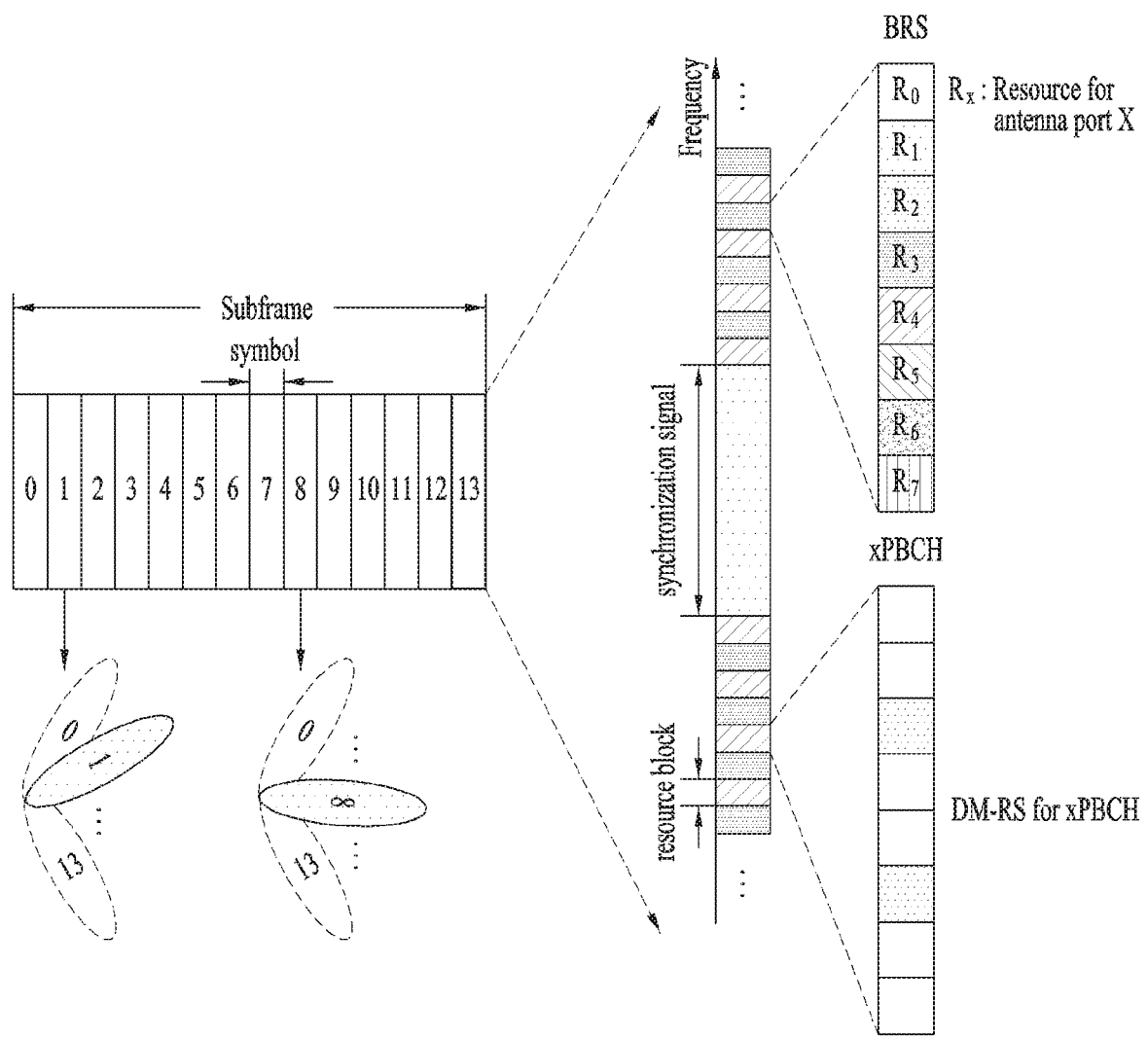
FIG. 6 is a diagram schematically illustrating the beam sweeping operation for synchronization signals and system information during a downlink (DL) transmission process according to an embodiment of the present invention.

FIG. 6 is a diagram schematically illustrating the beam sweeping operation for synchronization signals and system information during a downlink (DL) transmission process according to an embodiment of the present invention In FIG. 6, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, as described in FIG. 6, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

1.5. PT-RS (Phase Tracking Reference Signal)

Hereinafter, phase noise will be described. Jitter, which occurs in the time domain, may appear as phase noise in the frequency domain Such phase noise randomly changes the phase of the received signal in the time domain as shown in the following equation.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In Equation 1, the parameters $r_n$, $s_n$, $d_k$, $\phi_n$ indicate a received signal, a time-domain signal, a frequency-domain signal, and a phase rotation value due to phase noise, respectively. When the DFT (discrete Fourier transform) process is applied the received signal in Equation 1, Equation 2 is obtained.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)m/N} \quad \text{[Equation 2]}$$

In Equation 2, the parameters $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)m/N}$$

indicate common phase error (CPE) and inter-cell interference (ICI), respectively. In this case, as phase noise correlation increases, the value of the CPE in Equation 2 increases. Such CPE can be considered as a kind of carrier frequency offset in a WLAN system, but from the perspective of the UE, the CPE and CFO could be interpreted as to be similar to each other.

By performing CPE/CFO estimation, the UE can eliminate CPE/CFO corresponding to phase noise in the frequency domain. In addition, to correctly decode a received signal, the UE should perform the CPE/CFO estimation before decoding the received signal. Accordingly, the eNB can transmit a certain signal to the UE in order for the UE to perform the CPE/CFO estimation accurately. That is, the main purpose of such a signal is to estimate phase noise. To this end, a pilot signal previously shared between the eNB and UE in advance may be used, or a data signal may be changed or duplicated. In this specification, a series of signals for estimating phase noise are commonly called the phase compensation reference signal (PCRS), phase noise reference signal (PNRS), or phase tracking reference signal (PT-RS). Hereinafter, for convenience of description, all of them are referred to as the PT-RS.

1.5.1. Time Domain Pattern (or Time Density)

Figure 7:
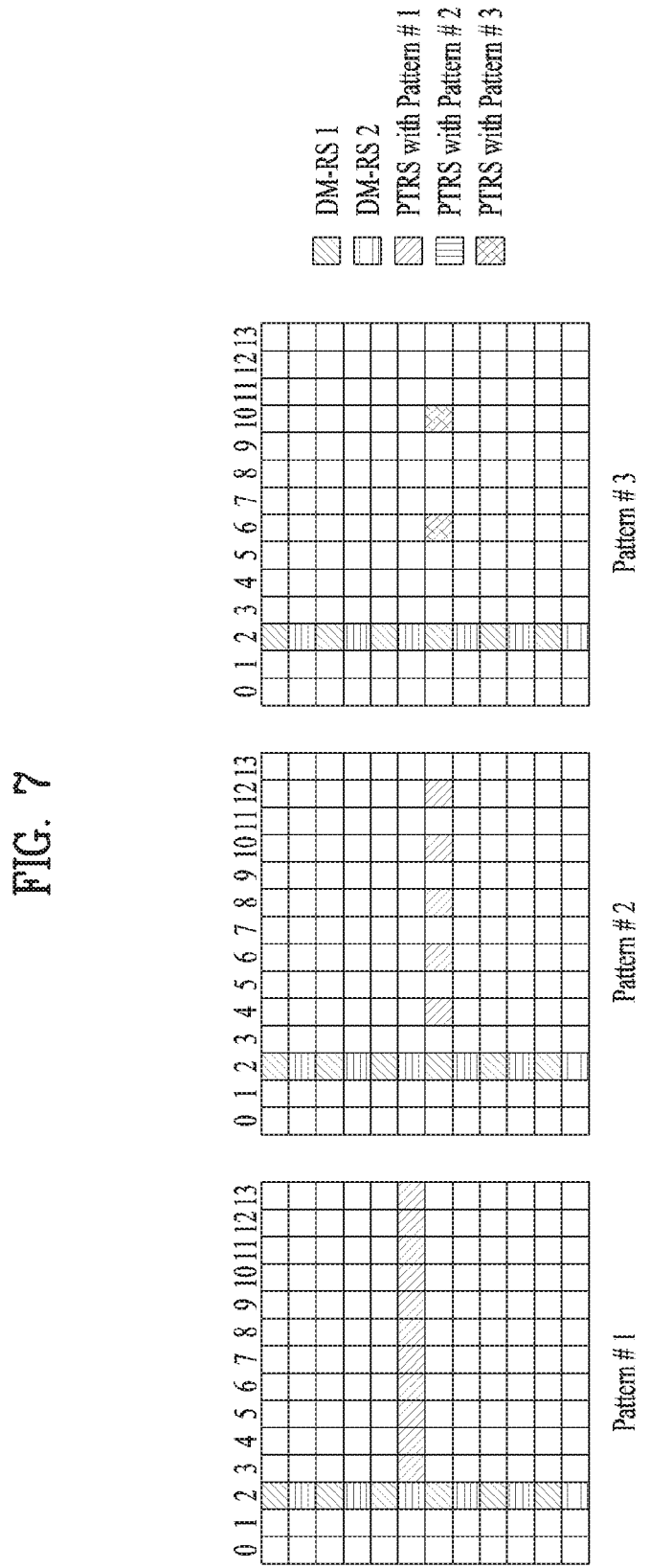
FIG. 7 is a diagram illustrating a time domain pattern of a PT-RS applicable to the present invention.

FIG. 7 is a diagram illustrating a time domain pattern of a PT-RS applicable to the present invention.

As shown in FIG. 7, a PT-RS may have a different pattern according to an MCS (Modulation and Coding Scheme) level.

TABLE 4

| MCS level | PT-RS time pattern |
|---|---|
| (64 QAM, CR = 1/3) <= MCS < (64 QAM, CR = 1/2) | #3 |
| (64 QAM, CR = 1/2) <= MCS < (64 QAM, CR = 5/6) | #2 |
| (64 QAM, CR = 5/6) <= MCS | #1 |

As shown in FIG. 7 and Table 4, a PT-RS can be transmitted in a manner of being mapped with a different pattern according to an MCS level.

More generally, the configuration above can be defined as follows. In particular, a time domain pattern (or time density) of the PT-RS can be defined as a table described in the following.

TABLE 5

| Scheduled MCS | Time density ($L_{PT\text{-}RS}$) |
|---|---|
| $I_{MCS}$ < ptrs-MCS1 | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In this case, time density 1 corresponds to a pattern #1 of FIG. 7, time density 2 corresponds to a pattern #2 of FIG. 7, and time density 4 may correspond to a pattern #3 of FIG. 7.

Parameters ptrs-MCS1, ptrs-MCS2, ptrs-MCS3, and ptrs-MCS4 constructing Table 5 can be defined by higher layer signaling.

1.5.2. Frequency Domain Pattern (or Frequency Density)

A PT-RS according to the present invention can be transmitted in a manner of being mapped to 1 subcarrier in every 1 RB (Resource Block), 2 RBs or 4 RBs. In this case, a frequency domain pattern (or frequency density) of the PT-RS can be configured according to a size of a scheduled bandwidth.

For example, a frequency domain pattern may have frequency density shown in Table 6 according to a scheduled bandwidth.

TABLE 6

| Scheduled BW | Frequency density |
|---|---|
| 0 < $N_{RB}$ <= 4 | No PT-RS |
| 5 < $N_{RB}$ <= 8 | 1 |
| 9 < $N_{RB}$ <= 16 | 1/2 |
| 17 < $N_{RB}$ <= 32 | 1/4 |

In this case, frequency density 1 corresponds to a frequency domain pattern that a PT-RS is transmitted in a manner of being mapped to 1 subcarrier in every 1 RB. Frequency density 1/2 corresponds to a frequency domain pattern that a PT-RS is transmitted in a manner of being mapped to 1 subcarrier in every 2 RBs. Frequency density 1/4 corresponds to a frequency domain pattern that a PT-RS is transmitted in a manner of being mapped to 1 subcarrier in every 4 RBs.

More generally, the configuration above can be defined as follows. In particular, a frequency domain pattern (or frequency density) of the PT-RS can be defined as a table described in the following.

TABLE 7

| Scheduled bandwidth | Frequency density ($K_{PT\text{-}RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In this case, frequency density 2 corresponds to a frequency domain pattern that a PT-RS is transmitted in a manner of being mapped to 1 subcarrier in every 2 RBs and frequency density 4 corresponds to a frequency domain pattern that a PT-RS is transmitted in a manner of being mapped to 1 subcarrier in every 4 RBs.

In the configuration above, $N_{RB0}$ and $N_{RB1}$ corresponding to reference values of a scheduled bandwidth for determining frequency density can be defined by higher layer signaling.

1.6. DM-RS (Demodulation Reference Signal)

In NR system to which the present invention is applicable, a DM-RS can be transmitted and received through a front-loaded structure. Or, an additional DM-RS of the front-loaded DM-RS can be additionally transmitted and received.

A front-loaded DM-RS can support fast decoding. The first OFDM symbol on which the front-loaded DM-RS is loaded can be determined by the $3^{rd}$ (e.g., l=2) or $4^{th}$ OFDM symbol (e.g., l=3). A location of the first OFDM symbol can be indicated by a PBCH (Physical Broadcast Channel).

The number of OFDM symbols occupied by the front-loaded DM-RS can be indicated by a combination of DCI (Downlink Control Information) and RRC (Radio Resource Control) signaling.

The additional DM-RS can be configured for a user equipment of high speed. The additional DM-RS can be located at the middle/last symbol(s) within a slot. When one front-loaded DM-RS symbol is configured, the additional DM-RS can be assigned to 0 to 3 OFDM symbols. When two front-loaded DM-RS symbols are configured, the additional DM-RS can be assigned to 0 or 2 OFDM symbols.

The front-loaded DM-RS is configured by two types and one of the two types can be indicated via higher layer signaling (e.g., RRC signaling).

FIG. 8 is a diagram briefly illustrating two DM-RS configuration types applicable to the present invention.

In FIG. 8, P0 to P11 may correspond to port number 1000 to 1011, respectively. A DM-RS configuration type actually set to a user equipment among the two DM-RS configuration types can be indicated via higher layer signaling (e.g., RRC).

The DM-RS configuration type 1 can be classified as follows according to the number of OFDM symbols to which a front loaded DM-RS is assigned.

DM-RS Configuration Type 1 and the Number of OFDM Symbols to which a Front Loaded DM-RS is Assigned=1

Maximum 4 ports (e.g., P0~P3) can be multiplexed based on length-2 F-CDM (Frequency-Code Division Multiplexing) and FDM (Frequency Division Multiplexing) methods. RS density can be configured by 6 REs per port within an RB (Resource Block).

DM-RS Configuration Type 1 and the Number of OFDM Symbols to which a Front Loaded DM-RS is Assigned=2

Maximum 8 ports (e.g., P0~P7) can be multiplexed based on length-2 F-CDM (Frequency-Code Division Multiplexing), length-2 T-CDM (Time-Code Division multiplexing), and FDM (Frequency Division Multiplexing) methods. In this case, when the existence of a PT-RS is configured via higher layer signaling, T-CDM can be fixed by [1 1]. RS density can be configured by 12 REs per port within an RB.

The DM-RS configuration type 2 can be classified as follows according to the number of OFDM symbols to which a front loaded DM-RS is assigned.

DM-RS Configuration Type 2 and the Number of OFDM Symbols to which a Front Loaded DM-RS is Assigned=1

Maximum 6 ports (e.g., P0~P5) can be multiplexed based on length-2 F-CDM and FDM methods. RS density can be configured by 4 REs per port within an RB (Resource Block).

DM-RS Configuration Type 2 and the Number of OFDM Symbols to which a Front Loaded DM-RS is Assigned=2

Maximum 12 ports (e.g., P0~P11) can be multiplexed based on length-2 F-CDM, length-2 T-CDM, and FDM methods. In this case, when the existence of a PT-RS is configured via higher layer signaling, T-CDM can be fixed by [1 1]. RS density can be configured by 8 REs per port within an RB.

Figure 9:
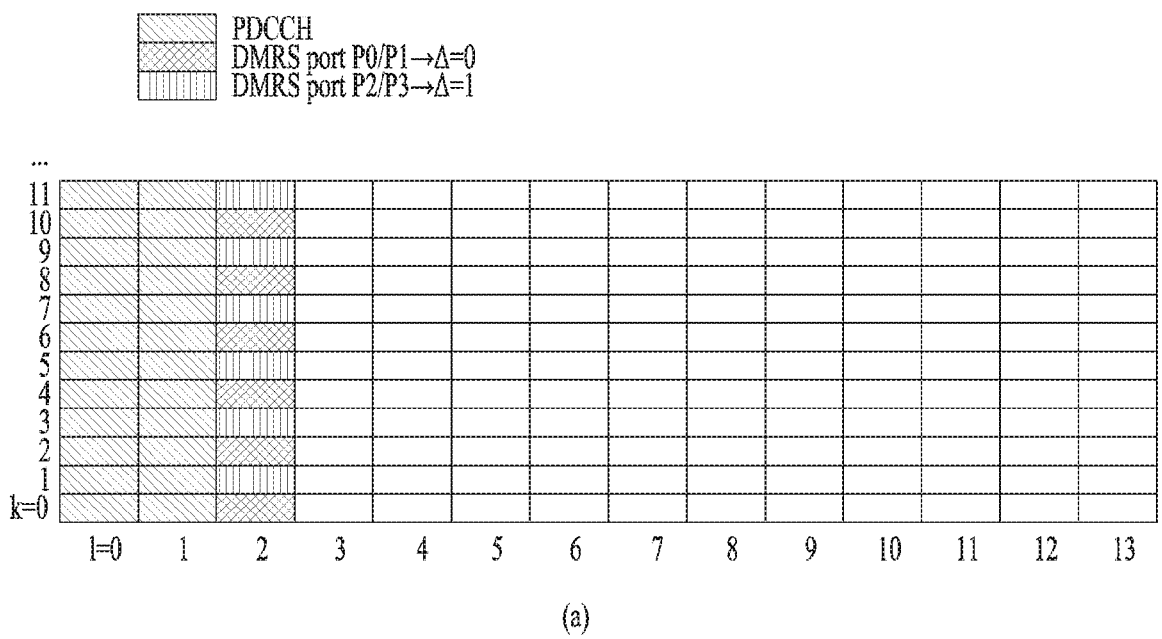
FIG. 9 is a diagram briefly illustrating an example for a front loaded DM-RS of a DM-RS configuration type 1 applicable to the present invention.
Figure 9:
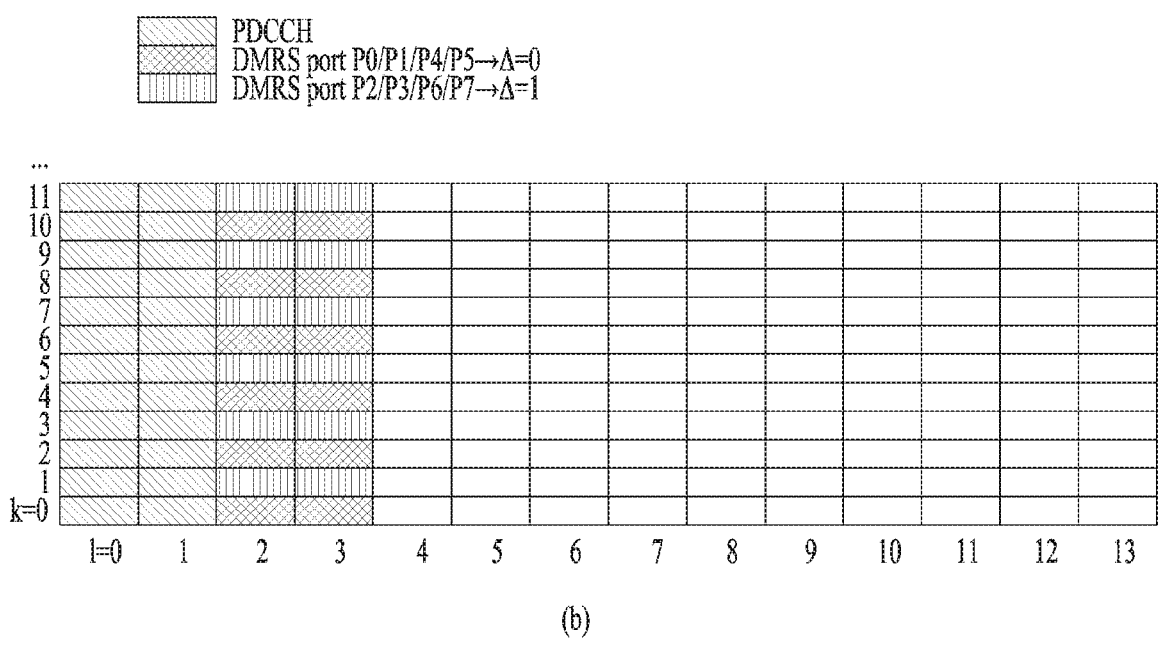

FIG. 9 is a diagram briefly illustrating an example for a front loaded DM-RS of a DM-RS configuration type 1 applicable to the present invention.

More specifically, FIG. 9 (a) illustrates a structure that a DM-RS is firstly loaded on one symbol (a front loaded DM-RS with one symbol) and FIG. 9 (b) illustrates a structure that a DM-RS is firstly loaded on two symbols (a front loaded DM-RS with two symbols).

In FIG. 9, Δ corresponds to a DM-RS offset value on a frequency axis. In this case, DM-RS ports having the same Δ can be CDM-F (code division multiplexing in frequency domain) or CDM-T (code division multiplexing in time domain). And, DM-RS ports having a different Δ can be CDM-F.

A user equipment can obtain information on a DM-RS port configuration configured by a base station via DCI.

1.7. DM-RS Port Group

In the present invention, a DM-RS port group may correspond to a set of DM-RSs having a QCL (Quasi co-located) relationship or partial QCL relationship. In this case, the QCL relationship means that channel environment such as Doppler spread and/or Doppler shift is the same. The partial QCL relationship means that partial channel environment is the same.

Figure 10:
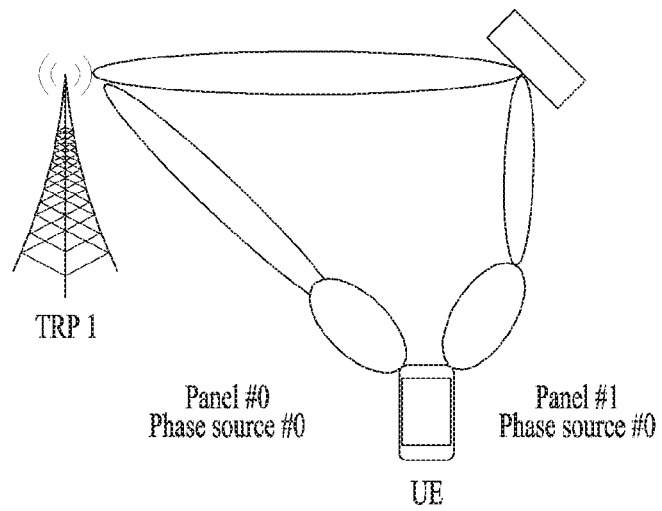
FIG. 10 is a diagram briefly illustrating an operation that a user equipment transceives a signal with a single base station using two DM-RS port groups.

FIG. 10 is a diagram briefly illustrating an operation that a user equipment transceives a signal with a single base station using two DM-RS port groups.

As shown in FIG. 10, a user equipment (UE) can include two panels. In this case, a single base station (e.g., TRP (Transmission Reception Point), etc.) can be connected with the UE through two beams. In this case, each of the beams may correspond to a single DM-RS port group. This is because DM-RS ports defined for a different panel may not be QCLed in the aspect of Doppler spread and/or Doppler shift.

Or, according to a different embodiment, a single DM-RS port group can be configured by a plurality of panels of a UE.

When DCI is defined according to a DM-RS port group, a UE can transmit a different CW (Codeword) according to a DM-RS port group. In this case, a single DM-RS port group can transmit one or two CWs. More specifically, when the number of layers corresponding to a DM-RS port group is equal to or less than 4, the DM-RS port group can transmit one CW. When the number of layers corresponding to a DM-RS port group is equal to or greater than 5, the DM-RS port group can transmit two CWs. And, DM-RS port groups different from each other may have a different scheduled BW.

When single DCI is defined for all DM-RS port groups participating in UL transmission, the DM-RS port groups can transmit one or two CWs. For example, when the total number of layers transmitted in two DM-RS port groups is equal to or less than 4, one CW is transmitted. On the other hand, when the total number of layers is equal to or greater than 5, two CWs can be transmitted.

According to the present invention, the number of UL DM-RS port groups can be set to a UE via SRI (SRS Resource Indication). For example, when the SRI sets two beams to a UE, the UE and a base station may regard it as two DM-RS port groups are set to the UE. According to an example of the present invention, the abovementioned configuration can be applied to a codebook-based UL transmission only.

Or, according to the present invention, the number of UL DM-RS port groups can be set to a UE through the number of SRS resource sets. For example, when a plurality of SRIs belonging to two different SRS resource sets are set to a UE, the UE and a base station may regard it as two DM-RS port groups are set to the UE. According to an example of the present invention, the abovementioned configuration can be applied to a non-codebook-based UL transmission only.

1.8. DCI Format in NR System

In NR system to which the present invention is applicable, it is able to support DCI formats described in the following. The NR system can support a DCI format 0_0 and a DCI format 0_1 as a DCI format for scheduling PUSCH and support a DCI format 1_0 and a DCI format 1_1 as a DCI format for scheduling PDSCH. And, the NR system can additionally support a DCI format 2_0, a DCI format 2_1, a DCI format 2_2, and a DCI format 2_3 as DCI formats capable of being utilized for other purposes.

In this case, the DCI format 0_0 is used for scheduling TB (Transmission Block)-based (or TB-level) PUSCH and the DCI format 0_1 can be used for scheduling TB (Transmission Block)-based (or TB-level) PUSCH or CBG-based (or CBG-level) PUSCH (when CBG (Code Block Group)-based signal transmission/reception is configured).

And, the DCI format 1_0 is used for scheduling TB-based (or TB-level) PDSCH and the DCI format 1_1 can be used for scheduling TB-based (or TB-level) PDSCH or CBG-based (or CBG-level) PDSCH (when CBG-based signal transmission/reception is configured).

And, the DCI format 2_0 is used for indicating a slot format, the DCI format 2_1 is used for indicating a PRB and an OFDM symbol that a specific UE assumes no intended signal transmission, the DCI format 2_2 is used for transmitting TPC (Transmission Power Control) commands of PUCCH and PUSCH, and the DCI format 2_3 can be used for transmitting a TPC command group for transmitting an SRS transmitted by one or more UEs.

A specific characteristic of the DCI format can be supported by 3GPP TS 38.212 document. In particular, among the DCI format-related characteristics, apparent steps and parts, which are not explained, can be explained with reference to the document. And, all terminologies disclosed in the present specification can be explained by the standard document.

1.9. Transmission Schemes

The NR system to which the present invention is applicable supports two transmission schemes described in the following for PUSCH: codebook-based transmission and non-codebook-based transmission.

According to one embodiment to which the present invention is applicable, when txConfig in a higher layer parameter PUSCH-Config, which is transmitted via higher layer signaling (e.g., RRC signaling), is configured by 'codebook', a codebook-based transmission can be set to a UE. On the other hand, when the txConfig in the higher layer parameter PUSCH-Config is configured by 'noncodebook', a non-codebook-based transmission can be set to the UE. If the higher layer parameter txConfig is not configured, PUSCH transmission, which is triggered by a specific DCI format (e.g., DCI format 0_0, and the like defined in 3GPP TS 38.211), can be performed based on a single PUSCH antenna port.

In the following description, a rank has the same meaning as the number of layers. For convenience of explanation, in the following description, the related technical features are described based on the term 'the number of layers'.

1.9.1. Codebook-Based UL Transmission

When a UE performs coherent transmission via a different panel, beamforming accuracy can be deteriorated due to phase noise. In particular, when phase noise exists, a UE can perform non-coherent transmission via panels different from each other.

Prior to detail explanation on coherent transmission and non-coherent transmission, a basic signal operation configuration of the present invention is described in the following.

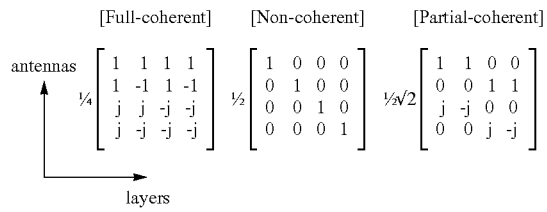

As illustrated above, a row (horizontal) direction of a precoding matrix corresponds to a specific (physical) antenna and a column (vertical) direction of a precoding matrix may correspond to a specific layer.

In this case, each antenna can be mapped to an RF chain by 1:1. In this case, the RF chain may correspond to a processing block where a single digital signal is converted into an analog signal.

In this case, coherent transmission may correspond to an operation that a layer (or data of a layer) performs transmission via all antennas.

More specifically, when a signal is transmitted based on a full-coherent precoding matrix, a signal transmitted via each antenna can be generated as follows on a baseband.

$$\frac{1}{4}\underbrace{\begin{bmatrix} 1 & 1 & 1 & 1 \\ 1 & -1 & 1 & -1 \\ j & j & -j & -j \\ j & -j & -j & -j \end{bmatrix}}_{Codebook} \underbrace{\begin{bmatrix} x_1 \\ x_2 \\ x_3 \\ x_4 \end{bmatrix}}_{data} = \frac{1}{4}\underbrace{\begin{bmatrix} x_1 + x_2 + x_3 + x_4 \\ x_1 - x_2 + x_3 - x_4 \\ jx_1 + jx_2 - jx_3 - jx_4 \\ jx_1 - jx_2 - jx_3 - jx_4 \end{bmatrix}}_{\substack{transmitted \\ signal}} \quad [\text{Equation 3}]$$

For example, according to the example above, ¼ ($X_1+X_2+X_3+X_4$) signal is generated for an antenna 1 and ¼ ($X_1-X_2+X_3-X_4$) signal can be generated for an antenna 2.

On the contrary, non-coherent transmission may correspond to an operation that a layer (or data of a layer) performs transmission via a specific antenna corresponding to the layer.

More specifically, when a signal is transmitted based on a non-coherent precoding matrix, a signal transmitted via each antenna can be generated as follows on a baseband.

$$\frac{1}{4}\underbrace{\begin{bmatrix} 1 & 0 & 0 & 0 \\ 0 & 1 & 0 & 0 \\ 0 & 0 & 1 & 0 \\ 0 & 0 & 0 & 1 \end{bmatrix}}_{Codebook} \underbrace{\begin{bmatrix} x_1 \\ x_2 \\ x_3 \\ x_4 \end{bmatrix}}_{data} = \frac{1}{4}\underbrace{\begin{bmatrix} x_1 \\ x_2 \\ x_3 \\ x_4 \end{bmatrix}}_{\substack{transmitted \\ signal}} \quad [\text{Equation 4}]$$

In this case, a signal is generated on a baseband due to a reason described in the following.

In the aforementioned antenna-RF chain configuration, an RF chain connected to each antenna corresponds to a combination of multiple RF elements. Each of the RF elements may generate unique distortion (e.g., phase shifting, amplitude attenuation).

In particular, when the distortion is insignificant, it may have no problem. However, if a value of the distortion is significant, it may affect beamforming.

For example, in an equation described in the following, a specific matrix (e.g., phase shifted matrix due to RF impairment) is additionally described to express contamination of a signal which has passed through an RF chain. In this case, if there is no distortion, the matrix becomes an identity matrix.

$$\frac{1}{4}\underbrace{\begin{bmatrix} e^{j\theta_1} & 0 & 0 & 0 \\ 0 & e^{j\theta_2} & 0 & 0 \\ 0 & 0 & e^{j\theta_3} & 0 \\ 0 & 0 & 0 & e^{j\theta_4} \end{bmatrix}}_{\substack{phase\ shift\ due\ to \\ RF\ imparement}} \underbrace{\begin{bmatrix} 1 & 1 & 1 & 1 \\ 1 & -1 & 1 & -1 \\ j & j & -j & -j \\ j & -j & -j & -j \end{bmatrix}}_{Codebook} \underbrace{\begin{bmatrix} x_1 \\ x_2 \\ x_3 \\ x_4 \end{bmatrix}}_{data} = \quad [\text{Equation 5}]$$

$$\frac{1}{4}\underbrace{\begin{bmatrix} e^{j\theta_1} & e^{j\theta_1} & e^{j\theta_1} & e^{j\theta_1} \\ e^{j\theta_2} & -e^{j\theta_2} & e^{j\theta_2} & -e^{j\theta_2} \\ je^{j\theta_3} & je^{j\theta_3} & -je^{j\theta_3} & -je^{j\theta_3} \\ je^{j\theta_4} & -je^{j\theta_4} & -je^{j\theta_4} & -je^{j\theta_4} \end{bmatrix}}_{Corrupted\ Codebook} \underbrace{\begin{bmatrix} x_1 \\ x_2 \\ x_3 \\ x_4 \end{bmatrix}}_{data}$$

In equation 5, it is necessary to transmit data such as $X_1$ in a vector direction such as [1 1 j j]. However, due to distortion generated by an RF chain, the data is transmitted in a direction of [$e^{j\theta_1}$ $e^{j\theta_2}$ $je^{j\theta_3}$ $je^{j\theta_4}$]. In particular, as values of $\theta_1$ $\theta_2$, $\theta_3$, $\theta_4$ are getting bigger, a signal transmission direction can be considerably changed from an original direction.

In this case, although distortions generated by 4 RF chains are big, if sizes of the distortions are all the same, no problem may occur. This is because, since $[e^{j\Theta_1} \; e^{j\Theta_1} \; je^{j\Theta_1} \; je^{j\Theta_1}]$, a beam direction is not changed irrespective of a size of $\theta_1$.

In particular, when the distortion of the RF chain is big, as illustrated in equation 6, it may be preferable not to perform beamforming (i.e., a non-coherent transmission scheme).

$$\underbrace{\frac{1}{4}\begin{bmatrix} e^{j\theta_1} & 0 & 0 & 0 \\ 0 & e^{j\theta_2} & 0 & 0 \\ 0 & 0 & e^{j\theta_3} & 0 \\ 0 & 0 & 0 & e^{j\theta_4} \end{bmatrix}}_{\text{phase shift due to RF impairment}} \underbrace{\begin{bmatrix} 1 & 0 & 0 & 0 \\ 0 & 1 & 0 & 0 \\ 0 & 0 & 1 & 0 \\ 0 & 0 & 0 & 1 \end{bmatrix}}_{\text{Codebook}} \underbrace{\begin{bmatrix} x_1 \\ x_2 \\ x_3 \\ x_4 \end{bmatrix}}_{\text{data}} = \quad \text{[Equation 6]}$$

$$\underbrace{\frac{1}{4}\begin{bmatrix} e^{j\theta_1} & 0 & 0 & 0 \\ 0 & e^{j\theta_2} & 0 & 0 \\ 0 & 0 & e^{j\theta_3} & 0 \\ 0 & 0 & 0 & e^{j\theta_4} \end{bmatrix}}_{\text{Corrupted Codebook}} \underbrace{\begin{bmatrix} x_1 \\ x_2 \\ x_3 \\ x_4 \end{bmatrix}}_{\text{data}}$$

Referring to equation 6, a codebook contaminated by distortion and a not contaminated codebook have such a difference as $e^{j\Theta_1}$, $e^{j\Theta_2}$, $e^{j\Theta_3}$, $e^{j\Theta_4}$ only in the aspect of data $X_1$. Consequently, the distortion can be corrected at the time of estimating a channel.

In particular, when distortion of an RF chain is not significant or distortions generated by all RF chains are the same, it may be preferable to transmit a signal using a full-coherent codebook capable of performing digital beamforming. Or, when each RF chain has a different distortion and a size of the distortion is big enough for affecting beamforming, it may be preferable to transmit a signal using a non-coherent codebook incapable of performing digital beamforming.

In addition, in case of a partial coherent codebook with rank 4 (or a partial coherent codebook for 4 layers), since characteristic of an RF chain connected with an antenna 1 is similar to characteristic of an RF chain connected with an antenna 3, it may consider that distortions generated by the RF chains are the same. The relationship above can be identically applied to an antenna 2 and an antenna 4 as well.

In particular, in case of the partial coherent codebook with rank 4 (or the partial coherent codebook for 4 layers) (e.g., TPMI index 1 or 2 in Table 14), a transmitter (e.g., UE) transmits a signal using a coherent transmission scheme for an antenna 1 & an antenna 3 (or an antenna 2 & an antenna 4) and can transmit a signal using a non-coherent scheme between the antenna 1 and the antenna 2. The abovementioned characteristic can be checked through TPMI indexes 4 to 11 of Table 10, TPMI indexes 6 to 13 of Table 12, and TPMI indexes 1 to 2 of Table 13.

On the other hand, when an MCS (Modulation and Coding Scheme) is low, an impact due to phase noise is not that big (i.e., marginal). In particular, the beamforming accuracy may not be considerably deteriorated (i.e., marginal). In this case, preferably, a UE can perform coherent combining.

Meanwhile, the impact due to the phase noise is different in relation to an RF (Radio Frequency). In particular, an expensive RF element may have very small phase noise.

In particular, the NR system applicable to the present invention can support both non-coherent transmission and coherent transmission.

In order to perform codebook-based transmission, a UE determines a codebook subset based on the reception of a TPMI (Transmitted Precoding Matrix Indicator) and codebookSubset included in higher layer signaling PUSCH-Config. In this case, the codebookSubset can be configured by one selected from the group consisting of 'fullAndPartialAndNonCoherent', 'partialAndNonCoherent', and 'nonCoherent' depending on UE capability indicating a codebook capable of being supported by the UE. In this case, the 'fullAndPartialAndNonCoherent' indicates that the UE is able to support a full-coherent codebook, a partial-coherent codebook, and a non-coherent codebook. The 'partialAndNonCoherent' indicates that the UE is able to support a partial-coherent codebook and a non-coherent codebook. The 'nonCoherent' indicates that the UE is able to support a non-coherent codebook only.

In this case, the maximum transmission rank (or the number of layers) applied to the codebook can be configured by maxrank included in the higher layer signaling PUSCH-Config.

Having reported 'partialAndNonCoherent' as UE capability of the UE, the UE does not expect that the codebook Subset is configured by the 'fullAndPartialAndNonCoherent'. This is because, as mentioned in the foregoing description, if the UE reports 'partialAndNonCoherent' as UE capability of the UE, it means that the UE does not support signal transmission based on a full coherent codebook. In particular, the UE may not expect a configuration (i.e., codebook subset is configured by 'fullAndPartialAndNonCoherent') for transmitting a signal based on the full coherent codebook.

Similarly, having reported 'nonCoherent' as UE capability of the UE, the UE does not expect that the codebook Subset is configured by the 'fullAndPartialAndNonCoherent' or the 'partialAndNonCoherent'.

The NR system to which the present invention is applicable supports two options using UL waveforms: one is CP-OFDM (Cyclic Prefix-Orthogonal Frequency Division Multiplexing) and another is DFT-s-OFDM (Discrete Fourier Transform-spread-Orthogonal Frequency Division Multiplexing). In this case, in order to generate the DFT-s-OFDM waveform, it is necessary to apply transform precoding.

When transform precoding is disabled for a UE according to the present invention or the UE is unable to apply the transform precoding, the UE uses the CP-OFDM waveform as an uplink waveform. On the contrary, when the transform precoding is abled for the UE or the UE is able to apply the transform precoding, the UE uses the DFT-s-OFDM waveform as an uplink waveform.

In the following description, when transform precoding is disabled for a specific UE or the specific UE is unable to apply the transform precoding, it is common referred to as a case that the transform precoding is disabled.

In this case, a precoder W, which is determined to perform codebook-based transmission, can be determined based on the number of transmission layers, the number of antenna ports, and a TPMI included in DCI for scheduling UL transmission according to a table described in the following.

Table 9 illustrates a precoding matrix W for performing single layer transmission using 2 antenna ports and Table 10 illustrates a precoding matrix W for performing single layer transmission using 4 antenna ports with transform precoding disabled.

TABLE 9

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 10

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

Table 11 illustrates a precoding matrix W for performing 2-layer transmission using 2 antenna ports with transform precoding disabled, Table 12 illustrates a precoding matrix W for performing 2-layer transmission using 4 antenna ports with transform precoding disabled, Table 13 illustrates a precoding matrix W for performing 3-layer transmission using 4 antenna ports with transform precoding disabled, and Table 14 illustrates a precoding matrix W for performing 4-layer transmission using 4 antenna ports with transform precoding disabled.

TABLE 11

| TPMI index | W (ordered from left to right in increasing order of TPMI index) |
|---|---|
| 0-2 | $\frac{1}{\sqrt{2}}\begin{bmatrix}1&0\\0&1\end{bmatrix}$ $\frac{1}{2}\begin{bmatrix}1&1\\1&-1\end{bmatrix}$ $\frac{1}{2}\begin{bmatrix}1&1\\j&-j\end{bmatrix}$ |

TABLE 12

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |

TABLE 12-continued

| TPMI index | W (ordered from left to right in increasing order of TPMI index) | | | |
|---|---|---|---|---|
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE 13

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 14

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

1.9.2. Non-Codebook-Based UL Transmission

When a plurality of SRS resources are configured to perform non-codebook-based transmission, a UE can determine a PUSCH precoder and a transmission rank (or the number of layers) based on a (wideband) SRI (Sounding reference signal Resource Indicator). In this case, the SRI can be provided via DCI or higher layer signaling.

In this case, the determined precoder may correspond to an identity matrix.

2. Proposed Embodiment

In the following, a configuration proposed in the present invention is explained in more detail based on the aforementioned technical idea.

In the present invention, a precoder or a precoding matrix corresponds to a transmission matrix for transmitting PUSCH transmitted by a UE. In this case, a UL PT-RS precoding vector can be defined in a form that a column of the precoder (or precoding matrix, transmission matrix) is multiplied by a specific coefficient. In this case, the specific coefficient may correspond to a power boosting level for a UL PT-RS port (based on power borrowed from a different layer and/or different UL PT-RS ports).

In the present invention, a different antenna panel of a UE can be defined by a different UL DM-RS port group. In other word, DM-RS ports defined according to a different antenna panel may not be QCL (Quasi co-located) in the aspect of Doppler spread and Doppler shift.

In case of codebook-based UL transmission, the number of UL DM-RS port groups can be set to a UE via an SRI (SRS Resource Indicator). For example, when the SRI sets two beams to a UE, it can be regarded as two DM-RS port groups are set to the UE. Or, when a single UL beam is set to a UE only, the UE may assume that a single DM-RS port group is set to the UE. [ ]

In the present invention, a different SRS resource may correspond to a different signal transmission beam. In particular, QCL may not be valid for antenna ports defined in a different SRS resource in the aspect of Doppler spread, Doppler shift, and spatial Rx parameters.

In the present invention, a beam can be replaced with a resource related to a specific reference signal (RS). In other word, in a configuration of the present invention described in the following, a 'beam' can be applied in a manner of being changed with a 'resource' or a 'resource related to a specific RS'.

When a UE performs codebook-based UL transmission based on each of one or more SRIs indicated by a base station, a PT-RS transmission method of the UE is explained in detail in the following. A method for a base station to receive a PT-RS from the UE is explained in detail as well.

A UE can obtain information on one or more SRS resources from a base station via one or more SRIs. The information on the one or more SRS resources can be forwarded to the UE via DCI or RRC signaling.

As mentioned in the foregoing description, when codebook-based UL transmission is performed, a different SRS resource may correspond to a different transmission beam. Hence, QCL may not be valid between antenna ports defined in a different SRS resource. In particular, a UE can configure/define a PT-RS according to an SRS resource. A base station can allocate/define a PT-RS to the UE according to an SRS resource.

In this case, a UE according to the present invention can determine the number of PT-RS ports and the like using one of methods described in the following.

First of all, for example, the UE can determine the number of UL PT-RS ports and/or a DM-RS port to which a corresponding PT-RS port is mapped based on a configured codeword (or a precoding matrix). In this case, the codeword (or the precoding matrix) can be indicated/determined based on a TRI (Transmission Rank Indicator) and a TPMI (Transmitted Precoding Matrix Indicator) indicated via DCI.

More specifically, the (maximum) number of DL/UL PT-RS ports for the UE can be configured via higher layer signaling (e.g., RRC signaling) or DCI. In particular, when implementation is actually performed, as mentioned in the foregoing description, the maximum number of PT-RS ports is configured and the actual number of DL/UL PT-RS ports can be configured by a method described in the following.

Or, a corresponding configuration can be applied in a manner of being changed with a configuration of overriding or reconfiguring the number of DL/UL PT-RS ports configured via higher layer signaling or DCI by a method described in the following.

In the configuration above, when an SRI or an SRS beam is set to a UE, the actual number of UL PT-RS ports can be determined based on a method described in the following.

(1) When a Full-Coherent Precoding Matrix is Set/Allocated to a UE as a Codeword When a full-coherent precoding matrix shown in equation 7 is set/allocated to a UE, the UE assumes that antennas ports different from each other have the same phase noise source. In particular, when a full-coherent precoding matrix is set/allocated to a UE, the UE can determine/define that the actual number of UL PT-RS ports corresponds to a single UL PT-RS port.

In addition, although the maximum number of DL/UL PT-RS ports is set to a UE, if a full-coherent precoding matrix is set/allocated to the UE, the UE may determine/consider that the number of UL PT-RS ports corresponds to a single UL PT-RS port irrespective of the maximum number of DL/UL PT-RS ports set to the UE.

$$\frac{1}{2\sqrt{2}}\begin{bmatrix} 1 & 1 \\ 1 & 1 \\ 1 & -1 \\ 1 & -1 \end{bmatrix} \quad \text{[Equation 7]}$$

(2) When a Non-Coherent Precoding Matrix is Set/Allocated to a UE as a Codeword

When a non-coherent precoding matrix shown in equation 8 is set/allocated to a UE, the UE assumes that antennas ports different from each other have a different phase noise source. In particular, when a non-coherent precoding matrix is set/allocated to a UE, the UE can determine/define that the actual number of UL PT-RS ports corresponds to two UL PT-RS ports. And, a PT-RS port may correspond to a DM-RS port corresponding to a column of the non-coherent precoding matrix shown in equation 8.

In addition, when the maximum number of DL/UL PT-RS ports is set to a UE, the UE to which a non-coherent precoding matrix is set/allocated can determine/consider the minimum value among the maximum number of DL/UL PT-RS ports and the number of antenna ports having a different phase noise source as the number of UL PT-RS ports. In particular, when the maximum number of DL/UL PT-RS ports is configured by 1 for a UE to which the non-coherent precoding matrix shown in equation 8 is set/allocated, the UE can determine/consider that the actual number of UL PT-RS ports corresponds to 1.

$$\frac{1}{2}\begin{bmatrix} 1 & 0 \\ 0 & 1 \\ 0 & 0 \\ 0 & 0 \end{bmatrix} \quad \text{[Equation 8]}$$

(3) When a Partial-Coherent Precoding Matrix is Set/Allocated to a UE as a Codeword When a partial-coherent precoding matrix shown in equation 9 is set/allocated to a UE, the UE assumes that antennas ports having a value rather than 0 in the same column have the same phase noise source and the antenna ports have a phase noise source different from a phase noise source of antenna ports having a value rather than 0 in a different column More specifically, when the partial coherent precoding matrix shown in equation 9 is set/allocated to a UE, the UE assumes that an antenna port 1 and an antenna port 2 (corresponding to a first row and a second row of the precoding matrix shown in equation 9) have the same phase noise source and the antenna port 1 and the antenna port 2 have phase noise different from phase noise of an antenna port 3 and an antenna port 4 (corresponding to a third row and a fourth row of the precoding matrix shown in equation 9). Hence, when a partial-coherent precoding matrix shown in equation 9 is set to a UE, the UE can determine/define that the actual number of UL PT-RS ports corresponds to 3 UL PT-RS ports. And, each of the PT-RS ports may correspond to a DM-RS port corresponding to a column of the partial-coherent precoding matrix.

In addition, when the maximum number of DL/UL PT-RS ports is set to a UE, the UE to which a partial-coherent precoding matrix is set/allocated can determine/consider the minimum value among the maximum number of DL/UL PT-RS ports and the number of antenna port groups having a different phase noise source as the number of UL PT-RS ports. In particular, when the maximum number of DL/UL PT-RS ports is configured by 2 for a UE to which the partial-coherent precoding matrix shown in equation 9 is set/allocated, the UE can determine/consider that the actual number of UL PT-RS ports corresponds to 2.

$$\frac{1}{2}\begin{bmatrix} 1 & 0 & 0 \\ 1 & 0 & 0 \\ 0 & 1 & 0 \\ 0 & 0 & 1 \end{bmatrix}$$ [Equation 9]

As an example different from the abovementioned example, a UE can determine the number of UL PT-RS ports and/or a DM-RS port to which a corresponding PT-RS port is mapped based on the number of configured SRIs and/or a configured codeword (or precoding matrix). In this case, the number of SRIs may correspond to the number of SRS resources set to the UE. And, the codeword (or precoding matrix) can be indicated/determined based on a TRI (Transmission Rank Indicator) and a TPMI (Transmitted Precoding Matrix Indicator) indicated via DCI.

In the example above, when a partial-coherent precoding matrix shown in equation 9 is set to a UE, the UE assumes a single SRI and can determine/define that the actual number of UL PT-RS ports corresponds to 3 in consideration of the partial-coherent precoding matrix shown in equation 9 only.

Meanwhile, when the maximum number of UL PT-RS ports is configured by 1, if 1 SRI (or SRS resource) is set to the UE, the UE can determine/define that the actual number of UL PT-RS ports corresponds to 1.

Meanwhile, when the maximum number of UL PT-RS ports is configured by 1 or 2, if 2 SRIs (or SRS resources) are set to the UE, the UE can determine/define that the actual number of UL PT-RS ports corresponds to 2. In particular, although the maximum number of UL PT-RS ports corresponds to 1, if two SRIs (or SRS resources) are set to the UE, the actual number of UL PT-RS ports can be configured/determined by overriding the maximum number of UL PT-RS ports. In this case, it is necessary for the UE to know information on whether or not columns of the precoding matrix shown in equation 9 belong to two SRS resources (or UL beam) indicated by the two SRIs. To this end, the UE can utilize CDM (Code Division Multiplexing) group information of a DM-RS. For example, DM-RS ports included in the same SRS resource can be referred/defined to/as an SRS port group or a DM-RS port group.

As a specific example, when a DM-RS port number is assigned to a UE, information on an SRS port group or a DM-RS port group can be configured/defined as follows. Assume that a column index and a DM-RS port number are sequentially mapped by 1:1 in accordance with an order. In Table 14, when the number of SRI corresponds to 1, a single port group (or DMRS port group) is defined only and a single UL PT-RS port is defined only. In Table 14, when the number of SRIs corresponds to 2, it is able to see that two SRS port groups (or DMRS port groups) are defined and two UL PT-RS ports are defined. In this case, a difference between the $2^{nd}$ row and the $3^{rd}$ row is in that a DMRS port belonging to a DM-RS port group #0 is different from a DMRS port belonging to a DM-RS port group #1.

TABLE 14

| # of SRI | DM-RS port number | Column index | DM-RS port group #0 | DM-RS port group #1 | PT-RS port #0 | PT-RS port #1 |
|---|---|---|---|---|---|---|
| 1 | #1000, #1001, #1002 | #1, #2, #3 | #1, #2, #3 | | #1000 | |
| 2 | #1000, #1001, #1002 | #1, #2, #3 | #1, #2 | #3 | #1000 | #1002 |
| 2 | #1000, #1002, #1003 | #1, #2, #3 | #1 | #2, #3 | #1000 | #1002 |

In addition, a base station and a UE can perform codebook set restriction based on configuration information of a PT-RS (e.g., on/off of PT-RS (or whether or not a PT-RS exists), information on whether or not a PT-RS is scheduled (e.g., whether or not a PT-RS is scheduled based on low MCS or narrow BW), etc.).

More specifically, when a PT-RS is not set/allocated to a UE, it may indicate that an impact on the UE due to phase noise is negligible. It may indicate that it is not necessary to apply/use a non-coherent codeword (or precoding matrix) (e.g., TPMI indexes #0 to #5 of Table 11) to the UE.

Hence, in this case, it may be able to utilize a coherent codeword (or precoding matrix) for the UE. In other word, a base station can configure/define a coherent codeword (or precoding matrix) as a precoding matrix for the UE. In particular, when the UE performs a codebook set restriction by utilizing PT-RS configuration information, it is able to reduce signaling overhead for indicating a codebook to the UE.

Or, the base station and the UE can perform codebook set restriction based on information on the number of (UL) PT-RS ports.

More specifically, when the base station sets/allocates the number of UL PT-RS ports to the UE by 1, the UE considers a single phase source only. In other word, when the base station sets the number of UL PT-RS ports to the UE by 1, it may mean that it is not necessary to apply/use a non-coherent codeword (or precoding matrix) (e.g., TPMI indexes #0 to #5 of Table 11) to the UE. Consequently, when the base station and the UE performs codebook set restriction based on the number of PT-RS ports, signaling overhead for indicating a codebook to the UE can be reduced.

CONCLUSION

A UE and a base station according to the present invention can transmit and receive a PT-RS based on a method described in the following.

Figure 11:
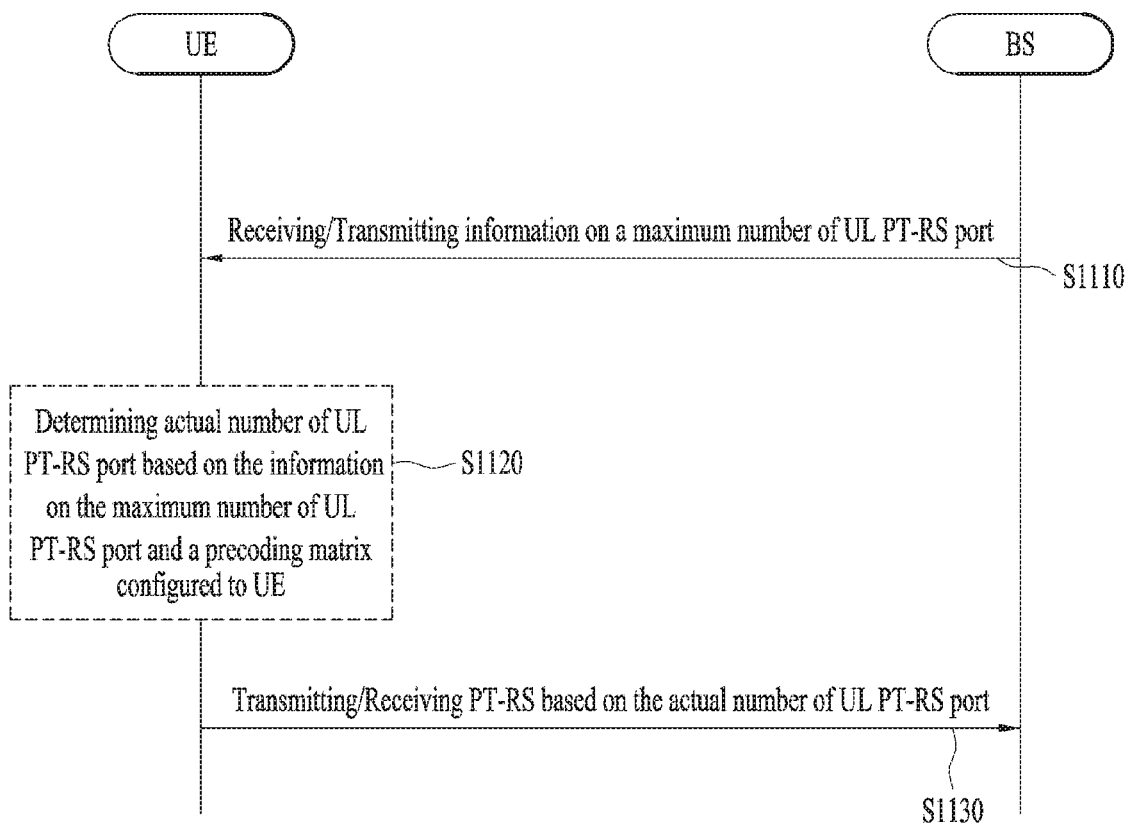
FIG. 11 is a diagram illustrating an operation of transmitting and receiving a PT-RS between a user equipment and a base station according to one embodiment of the present invention.
Figure 12:
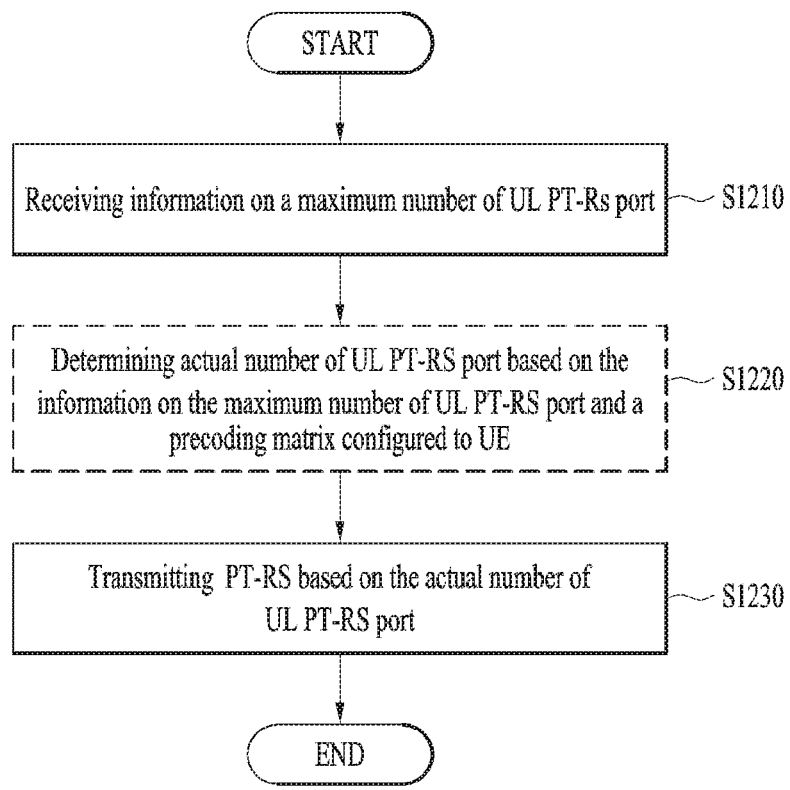
FIG. 12 is a flowchart illustrating an operation of a user equipment that transmits an uplink PT-RS to a base station according to the present invention.
Figure 13:
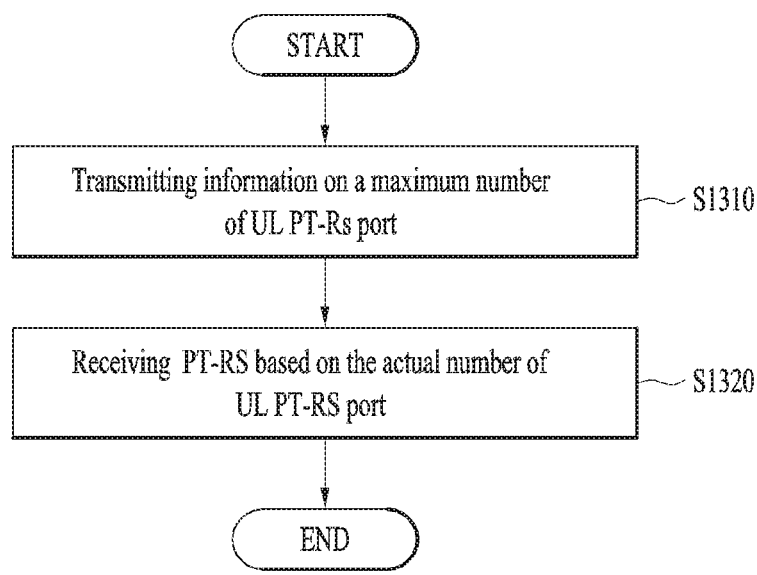
FIG. 13 is a flowchart illustrating an operation of a base station that receives an uplink PT-RS from a user equipment according to the present invention.

FIG. 11 is a diagram illustrating an operation of transmitting and receiving a PT-RS between a user equipment and a base station according to one embodiment of the present invention, FIG. 12 is a flowchart illustrating an operation of a user equipment that transmits an uplink PT-RS to a base station according to the present invention, and FIG. 13 is a flowchart illustrating an operation of a base station that receives an uplink PT-RS from a user equipment according to the present invention.

A user equipment (UE) receives information on a maximum number of uplink PT-RS port from a base station (S1110, S1210). Correspondingly, the base station transmits information on a maximum number of uplink PT-RS port to the UE (S1310).

The UE may determines actual number of UL PT-RS port based on the information on the maximum number of UL PT-RS port and a precoding matrix configured to UE (S1120, S1220).

And, the UE transmits the PT-RS based on the actual number of uplink PT-RS port to the base station (S1130, S1230). Correspondingly, the base station receives the PT-RS based on the actual number of uplink PT-RS port from the UE (S1320).

Herein, the information on the maximum number of uplink PT-RS port may be received via higher layer signaling (e.g., RRC signaling). That is, the UE may receive the information on the maximum number of uplink PT-RS port may be received via higher layer signaling from the base station.

In the present invention, the actual number of uplink PT-RS port may be equal to or smaller than the maximum number of uplink PT-RS port.

And, the precoding matrix configured to the UE is configured based on downlink control information (DCI). That is, the UE is configured with the precoding matrix by receiving DCI that including a transmitted precoding matrix indicator (TPMI) and configuring the precoding matrix to the UE from the base station.

In the present invention, the actual number of uplink PT-RS port determined based on a full-coherent precoding matrix configured to the UE may be determined as 1.

And, the actual number of uplink PT-RS port determined based on a partial-coherent precoding matrix or non-coherent precoding matrix configured to the UE may be determined up to the maximum number of uplink PT-RS port.

In this case, the actual number of uplink PT-RS port determined based on the partial-coherent precoding matrix or non-coherent precoding matrix configured to the UE may be determined under the assumption that one or more first antenna ports having non-zero value in a first column of the precoding matrix have an identical phase noise source and one or more second antenna ports having non-zero value in a different column from the first column of the precoding matrix have different phase noise from the one or more first antenna ports. That is, the UE determines the actual number of uplink PT-RS port based on the partial-coherent precoding matrix or non-coherent precoding matrix on assuming that one or more first antenna ports having non-zero value in a first column of the precoding matrix have an identical phase noise source and one or more second antenna ports having non-zero value in a different column from the first column of the precoding matrix have different phase noise from the one or more first antenna ports.

The UE may be configured with one or more sounding reference signal (SRS) resources.

Herein, the one or more SRS resources may be configured by one or more SRS resource indications (SRIs). And, the one or more SRIs are received via downlink control information (DCI).

Further, the actual number of uplink PT-RS port is determined additionally based on a number of SRS resources configured to the UE.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

3. Device Configuration

FIG. 14 is a diagram illustrating configurations of a UE and a base station capable of being implemented by the embodiments proposed in the present invention. The UE and the base station shown in FIG. 14 operate to implement the embodiments for a method of transmitting and receiving a phase tracking reference signal between the base station and the UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station includes a processor 40/140 for performing the aforementioned embodiments of the present invention. The processor 40/140 can be configured to implement the aforementioned explanation/proposed procedure and/or methods by controlling a memory 50/150, a transmitter 10/110, and/or a receiver 20/120.

For example, the processor 40/140 includes a communication modem designed to implement a wireless communication technology (e.g., LTE, NR). The memory 50/150 is connected with the processor 40/140 and stores various information related to an operation of the processor 40/140. For example, the memory 50/150 can perform all or a part of processes controlled by the processor 40/140 or store a software code including commands for performing the aforementioned explanation/proposed procedure and/or methods. The transmitter 10/110 and/or the receiver 20/120 are connected with the processor 40/140 and transmit and/or receive a radio signal. In this case, the processor 40/140 and the memory 50/150 may correspond to a part of a processing chip (e.g., System on a Chip (SoC)).

A UE 1 or a communication device included in the UE can be configured to receive information on the maximum number of PT-RS ports from a base station and transmit the PT-RS to the base station based on the actual number of uplink PT-RS ports. In this case, the actual number of uplink PT-RS ports can be determined based on the information on the maximum number of PT-RS ports and a precoding matrix set to the UE.

A base station 100 or a communication device included in the base station can be configured to transmit information on the maximum number of uplink PT-RS ports to a UE or a communication device corresponding to the UE and receive the PT-RS from the UE or the communication device corresponding to the UE based on the actual number of uplink PT-RS ports. In this case, the actual number of uplink PT-RS ports can be determined based on the information on the maximum number of PT-RS ports and a precoding matrix set to the UE.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

What is claimed is:

1. A method for transmitting a phase tracking reference signal (PT-RS) by a user equipment (UE) in a wireless communication system, the method comprising:
   receiving information on a maximum number of uplink PT-RS ports from a base station; and
   transmitting the PT-RS based on an actual number of uplink PT-RS ports to the base station,
   wherein the actual number of uplink PT-RS ports is determined based on the information on the maximum number of uplink PT-RS ports and a precoding matrix configured to the UE, such that, when the precoding matrix is a partial-coherent precoding matrix or non-coherent precoding matrix, the actual number of uplink PT-RS ports is determined to be the maximum number of uplink PT-RS ports.

2. The method of claim 1, wherein the information on the maximum number of uplink PT-RS ports is received via higher layer signaling.

3. The method of claim 1, wherein the actual number of uplink PT-RS ports is equal to or smaller than the maximum number of uplink PT-RS ports.

4. The method of claim 1, wherein the precoding matrix configured to the UE is configured based on a transmitted precoding matrix indicator (TPMI).

5. The method of claim 1, wherein, when the precoding matrix is a full-coherent precoding matrix configured to the UE, the actual number of uplink PT-RS ports is determined as 1 regardless of the maximum number of uplink PT-RS ports.

6. The method of claim 1, wherein the actual number of uplink PT-RS ports determined based on the partial-coherent precoding matrix or non-coherent precoding matrix configured to the UE is determined under the assumption that:
one or more first antenna ports having a non-zero value in a first column of the precoding matrix have an identical phase noise source, and
one or more second antenna ports having non-zero value in a different column from the first column of the precoding matrix have a different phase noise from the one or more first antenna ports.

7. The method of claim 1, wherein the UE is configured with one or more sounding reference signal (SRS) resources.

8. The method of claim 7, wherein the one or more SRS resources are configured by one or more SRS resource indications (SRIs).

9. The method of claim 8, wherein the one or more SRIs are received via downlink control information (DCI).

10. The method of claim 7, wherein the actual number of uplink PT-RS ports is determined additionally based on a number of SRS resources configured to the UE.

11. A communication device for transmitting an uplink phase tracking reference signal (PT-RS) in a wireless communication system, the communication device comprising:
a memory; and
a processor operably coupled with the memory and configured to:
receive information on a maximum number of uplink PT-RS ports from a base station; and
transmit the PT-RS based on an actual number of uplink PT-RS ports to the base station,
wherein the actual number of uplink PT-RS ports is determined based on the information on the maximum number of uplink PT-RS ports and a precoding matrix configured to the UE, such that, when the precoding matrix is a partial-coherent precoding matrix or non-coherent precoding matrix, the actual number of uplink PT-RS ports is determined to be the maximum number of uplink PT-RS ports.

12. The communication device of claim 11,
wherein the information on the maximum number of uplink PT-RS ports is received via higher layer signaling, and
wherein the precoding matrix configured to the communication device is configured based on downlink control information (DCI) or higher layer signaling.

13. The communication device of claim 11, wherein, when the precoding matrix is a full-coherent precoding matrix configured to the communication device, the actual number of uplink PT-RS ports is determined as 1 regardless of the maximum number of uplink PT-RS ports.

14. A communication device for receiving an uplink phase tracking reference signal (PT-RS) in a wireless communication system, the communication device comprising:
a memory; and
a processor operably coupled with the memory and configured to:
transmit information on a maximum number of uplink PT-RS ports to a user equipment; and
receive the PT-RS based on an actual number of uplink PT-RS ports from the user equipment,
wherein the actual number of uplink PT-RS ports is determined based on the information on the maximum number of uplink PT-RS ports and a precoding matrix configured to the UE, such that, when the precoding matrix is a partial-coherent precoding matrix or non-coherent precoding matrix, the actual number of uplink PT-RS ports is determined to be the maximum number of uplink PT-RS ports.

* * * * *